Nov. 21, 1944. N. S. FOCHT 2,363,308
SHOCK ABSORBER
Filed Nov. 6, 1943 3 Sheets-Sheet 1
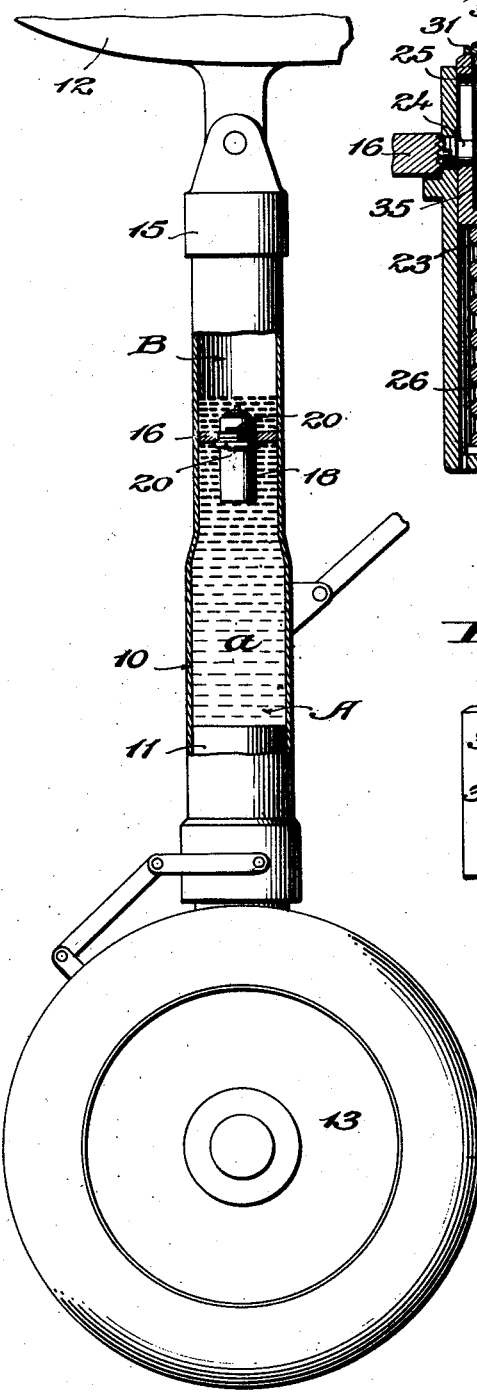
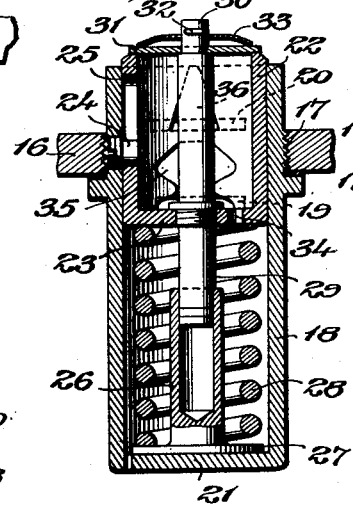
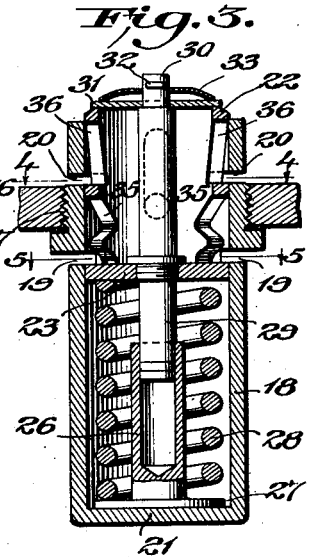
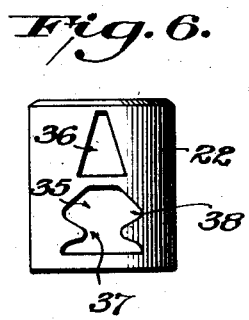
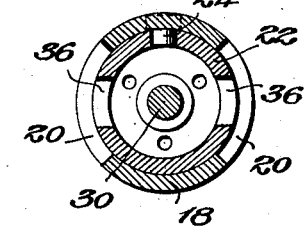
Inventor
Nevin S. Focht,
By Wolhaupter & Groff
Attorneys

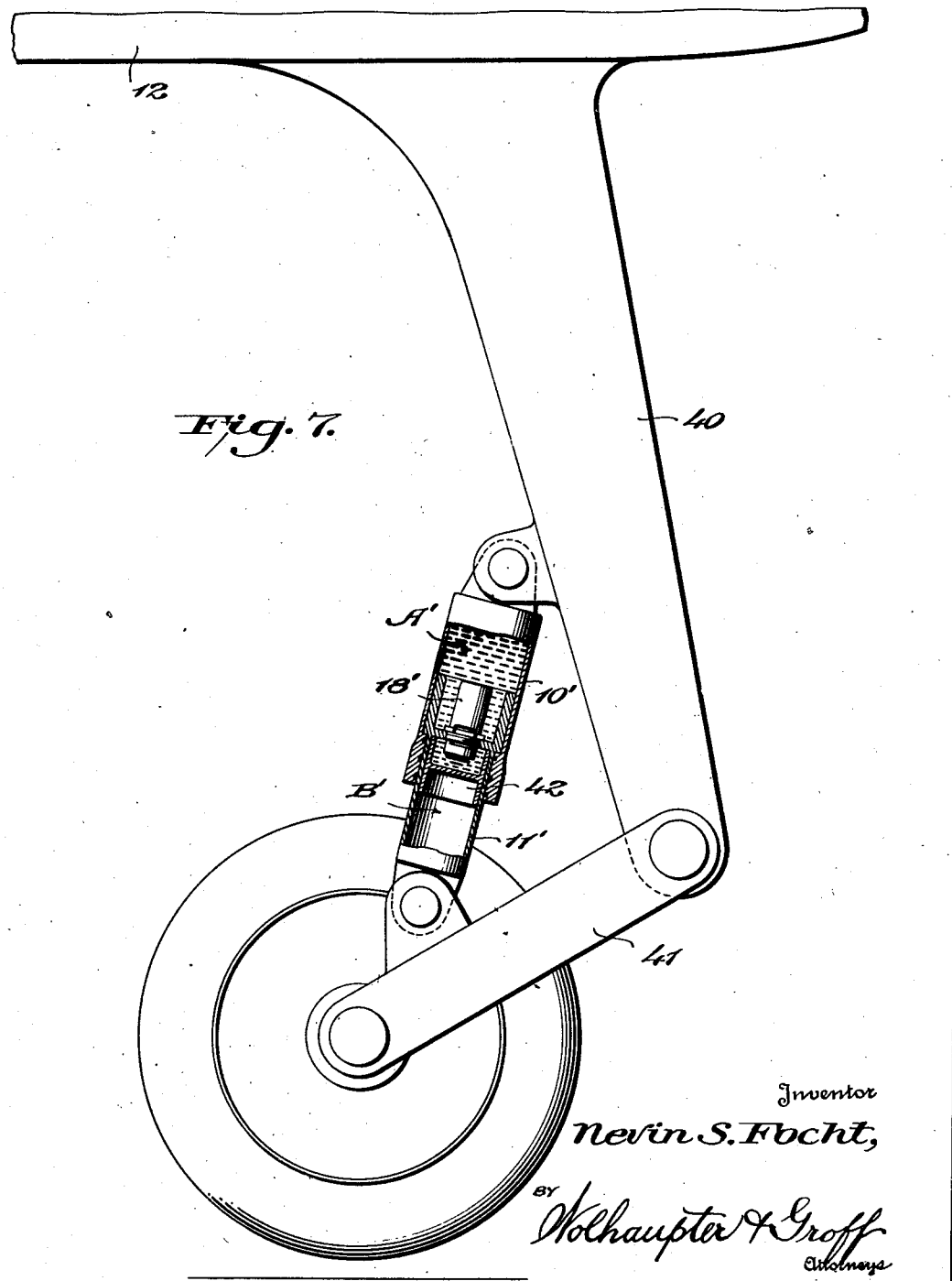

Nov. 21, 1944.   N. S. FOCHT   2,363,308
SHOCK ABSORBER
Filed Nov. 6, 1943   3 Sheets-Sheet 3
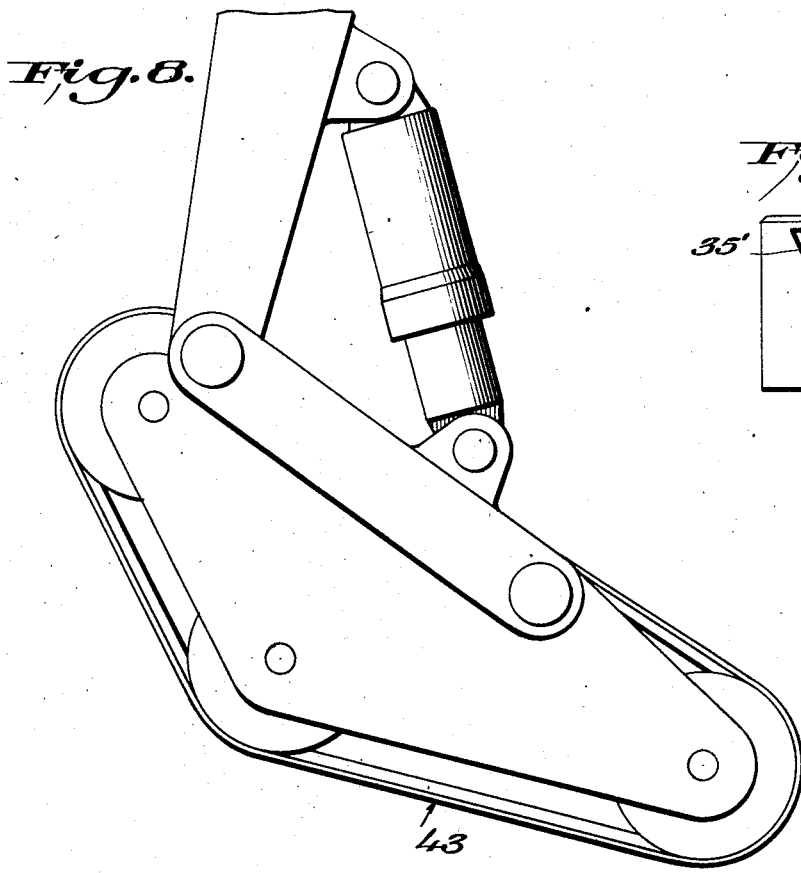
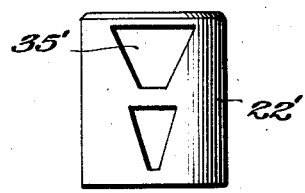
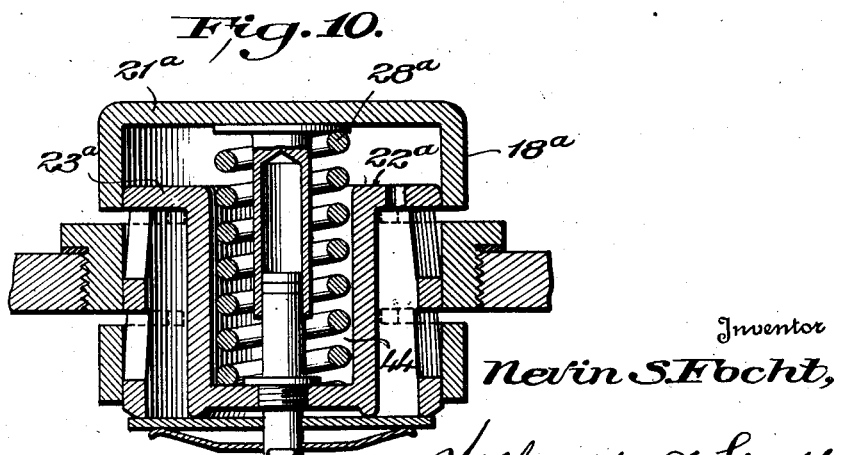
Inventor
Nevin S. Focht,
By Wolhaupter & Groff
Attorneys Patented Nov. 21, 1944

2,363,308

UNITED STATES PATENT OFFICE 2,363,308

SHOCK ABSORBER

Nevin S. Focht, Syracuse, N. Y.

Application November 6, 1943, Serial No. 509,304

6 Claims. (Cl. 267—64)

This invention relates to shock absorbers, particularly for use on aircraft, although capable of other uses, and has for its general object to provide a strong, light-weight, highly efficient oleo-pneumatic shock absorber which has good springing qualities and which is automatically adjustable in response to impact loads imposed thereon to offer smooth, even resistance to such loads throughout its stroke despite sudden momentary increases in the loads at different points in its stroke.

One special and important object of the present invention is to provide a shock absorber which, as distinguished from oleo-pneumatic or hydraulic shock absorbers of the metering pin type, is devoid of any so-called "peaking" or locking and consequent momentary rigidity due to sudden momentary impact loads imposed thereon.

Another special and important object of the present invention is to provide a shock absorber which is more economical to build and far less critical to variations in manufacture than shock absorbers of the metering pin type.

With the foregoing and other objects in view, which will become more fully apparent as the nature of the invention is better understood, the same consists in an oleo-pneumatic shock absorber embodying the novel features of construction, combination and arrangement of parts as will be hereinafter more fully described, illustrated in the accompanying drawings and defined in the appended claims.

In the accompanying drawings, wherein like characters of reference denote corresponding parts in related views:

Figure 1 is a side elevation, partly in section, of a shock absorber constructed in accordance with one practical embodiment of the invention and employed as a strut of a strut-type airplane landing gear, Figure 2 is a central, longitudinal section through the liquid metering valve shown in Figure 1.

Figure 3 is a section similar to Figure 2 but taken at right angles thereto.

Figures 4 and 5 are cross sections on the lines 4—4 and 5—5, respectively, of Figure 3.

Figure 6 is a side elevation of the piston element of the valve shown in Figures 1 to 5.

Figures 7 and 8 are views similar to Figure 1 illustrating alternative embodiments of the invention.

Figure 9 is a side elevation of the piston element of the valve shown in Figure 8; and Figure 10 is a view similar to Figure 3 illustrating an alternative form of the liquid metering valve.

Referring to the drawings in detail, first with particular reference to the embodiment of the invention illustrated in Figures 1 to 6, it will be observed that the present shock absorber is of the cylinder and piston type and comprises, primarily, a cylinder, designated as 10, and a piston slidable thereon and designated as 11. It will further be observed that according to the particular example of the invention illustrated in said figures, the shock absorber is disposed vertically and serves as a strut between the fuselage 12 of an aircraft and a landing wheel 13 thereof equipped with a penumatic tire 14, the cylinder 10 being disposed uppermost and being closed at its upper end by a head 15 through the instrumentality of which it is connected to the fuselage 12, and the piston 11 being disposed lowermost and carrying at its lower end the landing wheel 13.

The lower portion of the cylinder 10 constitutes a liquid-containing chamber, designated as A, and is filled with a body of liquid designated as a, while the upper portion of said cylinder constitutes a compressed air-containing chamber, designated as B, in which the air is under a suitable pressure above atmospheric pressure even when the cylinder 10 and the piston 11 are fully distended relative to each other.

In the cylinder 10 is a bulkhead 16 having an opening 17 through which extends the upper end portion of a valve casing 18, and in accordance with the invention said valve casing 18 either is threaded in said opening 17 or otherwise is suitably fastened to said bulkhead in closing relationship to said opening, and said bulkhead otherwise is closed against flow of liquid therethrough, so that all flow of liquid between the chambers A and B necessarily is through said valve casing. In this connection, while the bulkhead 16 may be located at any suitable point in the cylinder 10 below the top of said cylinder and above the uppermost limit of movement of the upper end of the piston 11, the level of the liquid a in said cylinder, when the latter and the piston are fully distended, is such as to cover said bulkhead and the upper end portion of said valve casing which projects thereabove. In other words, the valve casing 18 is, at all times, submerged in the liquid a and the latter constitutes a piston for varying the effective area of the air-containing chamber B.

Below the bulkhead 16 the valve casing is provided with a pair of diametrically opposed ports 19 of narrow preferably uniform depth and considerable length, while above said bulkhead said valve casing is provided with another pair of diametrically opposed ports 20 which likewise are of narrow, preferably uniform depth and considerable length. Moreover, the ports 19, 20 at opposite sides of said valve casing preferably are alined with each other longitudinally of said valve casing, but this is not essential and said ports 19, 20 may be spaced apart angularly, if desired.

The valve casing 18 is closed at its lower end by a wall 21, is open at its upper end, and has neatly, liquid-tightly fitted in its upper end portion and longitudinally slidable therein a hollow piston 22 which is closed at its lower end by a wall 23 and is open at its upper end. A pin 24 threaded in an opening in the side wall of the valve casing 18 and having its inner end disposed in a slot 25 in the side wall of the piston 22, serves to prevent rotation and to limit longitudinal movement of said piston relative to said valve casing and also to retain said piston in assembly with said valve casing.

In the lower end portion of the valve casing 18 is a small cylinder 26 which is open at its upper end, closed at its lower end and seated at its lower end upon the lower end wall 21 of said valve casing. Moreover, an annular flange 27 extends laterally from said cylinder and between this flange and the lower end wall 23 of the piston 22 is interposed an expansion spiral spring 28 which holds said cylinder against upward movement and tends constantly to urge said piston upwardly. Furthermore, a plunger 29 is carried by the lower end wall of the piston 22 and extends downwardly therefrom into said cylinder in closely fitting, liquid-tight, slidable engagement therewith. The cylinder 26 contains air which is under atmospheric pressure when the piston 22 and the plunger 29 are in their uppermost positions.

Preferably, the cylinder 26 is separate from the lower end wall 21 of the casing 18 so that it may shift superficially relative to said lower end wall to avoid any binding between the same and the plunger 29. However, said cylinder 26 may, if desired, be formed as an integral part of said casing end wall 21.

Also carried by the lower end wall of the piston 22 and extending upwardly therefrom through said piston beyond the upper, open end thereof, is a rod 30 upon the upper end portion of which is slidably mounted a disk valve 31 for opening and closing cooperation with the said upper, open end of said piston. Between the disk valve 31 and a cotter pin 32 or other suitable abutment carried by the upper end portion of the rod 30 above said disk valve, is interposed a suitable light spring 33 which tends constantly to urge said disk valve downwardly into closing relationship to the upper, open end of the piston 22 and which permits said disk valve to rise and open when liquid in said piston is under a greater pressure than liquid above said valve.

Appropriately, the plunger 29 and the rod 30 may be of one-piece form and may be fastened to the lower end wall of the piston 22 by being threaded therein as shown.

In the lower end wall 23 of the piston 22 is either a single hole or, if desired, a plurality of holes, 34, which afford constant communication between the interior of said piston and the interior of the casing 18 below said piston 22, while in the side wall of said piston 22, at diametrically opposite points, are lower and upper pairs of ports 35 and 36, respectively, for cooperation with the pairs of ports 19, 20, respectively, in the side wall of the valve casing 18. If the ports 19, 20 are alined longitudinally, the ports 35, 36 likewise are alined longitudinally. If, on the other hand, the ports 19, 20 are angularly spaced apart, the ports 35, 36 are similarly spaced apart angularly. In other words, the arrangement of the ports 19, 20, 35 and 36 is such that the ports 19, 35 cooperate with each other and the ports 20, 36 cooperate with each other, the said ports preferably being provided in pairs, diametrically opposed, to avoid any lateral thrust of the piston 24 against the casing 20 due to flow of liquid through the ports 19, 35 and 20, 36 into and through said piston. If desired, however, only single ports 19, 20 and 35, 36 may be provided in the valve casing 18 and the piston 22, respectively.

The ports 35 are of maximum width at their lower ends, of gradually reduced width upwardly from their lower ends to intermediate points 37, then are of gradually increasing width upwardly to points 38 of maximum width, and from the latter points again are of gradually reduced width to their upper ends. On the other hand, the ports 36 are of maximum width at their lower ends and of gradually and constantly decreasing width toward their upper ends. Moreover, the ports 35, 36 are equal in length and their lower and upper ends, respectively, have the same spaced apart relationship as the ports 19, 20 so that corresponding portions thereof always register with the ports 19 and 20, respectively. Furthermore, the lower end portions of the ports 35, 36 are alined with the ports 19, 20, respectively, when the piston 22 is at its limit of upward movement in the valve casing 18.

Since the valve 18 is submerged in the liquid $a$ and since some portions of the ports 35, 36 obviously always are alined with the ports 19, 20, respectively, and since the hole or holes 34 afford constant communication between the interior of said piston 22 and the interior of the casing 18 below said piston, it follows that said piston and the portion of the casing 18 below the same always are filled with liquid. In this connection, it is apparent that, through the disk valve 31, the upper end of the piston 22, to its outside diameter, is subjected to the pressure of the air in the air chamber B. It is equally apparent that the lower end of said piston 22 is subjected to the pressure of the liquid therebelow in the lower end of the casing 18 and that the area of the lower end of said piston 22 against which the liquid pressure acts is lesser than the area of the upper end of said piston against which the air pressure in the chamber B acts by an amount equal to the cross sectional area of the plunger 29. Accordingly, as long as the pressure of the air in the chamber B is equal or nearly equal to the pressure of the liquid in the chamber A, it will tend to move the piston 24 downwardly against the force exerted upwardly thereon by the spring 28 and at a velocity dependent upon the pressure of the air in the chamber B, the strength of the spring 28 and the area of the hole or holes 34.

For any given installation of the shock absorber, the air in the chamber B is, as aforesaid, under a predetermined minimum pressure above atmospheric pressure when the cylinder 10 and the piston 11 are fully distended relative to each other, as shown in Figure 1. Therefore, when the shock absorber is fully distended and not subjected to load, the air pressure in the chamber B maintains the disk valve 33 closed and tends to move the piston 22 downwardly. The strength of the spring 28 is such, however, as to hold said piston 22 at its uppermost limit of movement against the minimum air pressure existing in the chamber B when the shock absorber is fully distended. Accordingly, when the shock absorber is fully distended, the lower, under portions of the ports 35, 36 are registered with the ports 19, 20, respectively.

Upon the shock absorber being subjected to an impact load with consequent inward movement of the cylinder 10 and the piston 11 relative to each other the pressure of the liquid in the chamber A rises and liquid flows from said chamber A through the ports 19 and the lower ends of the ports 35 into the piston 22, some of it then flowing from said piston through the ports 20, 36 into the chamber B and the remainder acting upon the disk valve 33 to open the same and flowing through the open, upper end of said piston into said chamber B. The pressure of the air in the chamber B thereby is raised and acts to move the piston 22 downwardly, its amount of downward movement depending, of course, upon the amount of rise in pressure of the air in the chamber A, the strength of the spring 28 and the area of the hole or holes 34. In other words, for each different stroke position of the shock absorber and the corresponding pressure of the air in the chamber B, the piston 22 obviously will assume a different position in the valve casing 18, the strength of the spring 28 being such that said piston assumes its lowermost position when the shock absorber is approximately fully collapsed and the air in the chamber B is under approximately maximum pressure.

Assuming use of the shock absorber as part of an aircraft landing gear of the wheeled, pneumatic tire or equivalent type and assuming, further, that the aircraft is landing with the shock absorber fully distended, the operation is as follows: As the tire 14 engages the ground the tire is moderately deformed until its resistance force equals the force required to overcome the inertia of the liquid $a$. Then, upon increase of the resistance force due to the weight of the aircraft being progressively imposed upon the tire 14, collapse of the shock absorber begins and the liquid $a$ begins to flow from the chamber A through the impact control ports 19, 35 into the piston 22 and through the latter into the chamber B, further compressing the air in the chamber B and thereby initiating downward movement of the piston 22. In this connection it is apparent that only the ports 19, 35 control flow of the liquid $a$ resulting from imposition of impact forces upon the shock absorber because the disk valve 31 is free to open to permit flow of the liquid from the piston 22 into the chamber B and would do so even in the complete absence of the ports 20, 36. It is further apparent in this connection that the wide bottom portions of the ports 35, at this time in register with the ports 19, invite free flow of the liquid and quick overcoming of its inertia so that the shock absorber begins to function to absorb the impact load substantially immediately following contact of the tire 14 with the ground. It is additionally apparent in this connection that since the ports 35 are gradually but rapidly reduced in width from their wider bottom portions to their portions of least width at the points 37, initial downward movement of the piston 22 causes a gradual but rapid reduction in the effective areas of said ports 35, i. e., the areas thereof which are in registration with the ports 19, so as to offer a gradual but rapid resistance to flow of the liquid and thus cause a gradual deformation or deflection of the tire 14.

As the tire 14 approaches normal deformation or deflection, the portions of the ports 35 above their portions 37 of least width begin to register with the ports 19, and since the said portions of said ports 35 above their portions 37 of least width progressively increase in width, it is apparent that continued imposition of load upon the shock absorber, with continued downward movement of the piston 22, results in progressive increase in the effective areas of the ports 35 and greater freedom to flow of the liquid as the air in the chamber B becomes more highly compressed and offers progressively increasing resistance to the impact load. In this connection it is pointed out that the ports 19, 35 are of such predetermined shape and size in relation to the other elements of the shock absorber that the tire 14 and the shock absorber act together to gradually absorb at a uniform rate the initial impact forces resulting from landing of the aircraft until substantially maximum deformation or deflection of the tire 14 occurs and the shock absorber then acts substantially alone to continue to gradually absorb at the same uniform rate additional impact forces resulting from landing of the aircraft. The result is that, despite the initial rapid cushioning action of the tire 14, the tire and the shock absorber coact to offer a smooth and even or uniform resistance to impact landing forces of the aircraft from the beginning to the end of imposition of such forces and throughout the corresponding stroke of the shock absorber.

When the full weight of the aircraft is imposed upon the shock absorber, the piston 22 has a position in which the wider portions 38 of its ports 35 are registered with the ports 19 to afford maximum effective area of said ports 35. Therefore, during taxiing of the aircraft, free flow of the liquid is permitted and the shock absorber insures a soft, flexible taxiing condition.

During any landing of the aircraft, its landing velocity may result in a greater load than its weight being imposed upon the shock absorber with consequent increased collapse of the shock absorber and movement of the piston 22 below a position in which the wider portions 38 of its ports 35 are alined with the ports 19. In that event, the progressively decreasing areas of the ports 35 above their wider portions 38 provide for gradual constriction of their effective areas with consequent progressively increasing resistance to the increased load until the force thereof is absorbed.

Upon recoil of the shock absorber, the disk valve 31 prevents flow of liquid from the chamber B into the piston 22 through the upper open end and requires the liquid, in its flow from said chamber B to the chamber A, to pass through the ports 20, 36. The ports 36 are of such predetermined widths at different points along their lengths that, for each different stroke position of the shock absorber and the corresponding pressure of the air in the chamber B, the effective areas of said ports 36 are such as to permit just the right amount of liquid to flow from the chamber B to the chamber A to gradually absorb the recoil force. During recoil of the shock absorber liquid flows from the piston 22 through the ports 35, 19 into the chamber A, and since the ports 35 are, as aforesaid, larger than the ports 36, they have no effect to meter recoil flow of the liquid. On the contrary, metering of recoil flow of the liquid obviously is controlled solely by the ports 20, 36.

In shock absorbers of the metering pin type as applied to aircraft, if the metering pin and the orifice controlled thereby are designed for maximum efficiency of the shock absorber in absorbing normal impact loads due to landing of the aircraft, there always exists the danger that upon any abnormal or crash-like landing of the aircraft the orifice controlled by the metering pin may momentarily become choked with liquid with consequent so-called "peaking" or momentary locking of the shock absorber, in which event the latter may act as a solid strut and cause the aircraft to be subjected to more or less severe stresses, sometimes even higher than it is designed to resist with its resultant collapse. If, on the other hand, in an effort to avoid or reduce the likelihood of any such occurrence, greater orifice area is provided, efficiency is sacrificed in deference to safety. In this connection and as distinguished from shock absorbers of the metering pin type, the present shock absorber employs the piston 22 in lieu of a metering pin, and since the position of said piston obviously is affected only by pressures developed and not by flow of the liquid, and since the ports 35 may be amply large so as not to become choked with liquid even under actual crash landing loads imposed upon the shock absorber, it is apparent that the present shock absorber is not subjected to any so-called "peaking" or locking. It is equally manifest that this great advantage is not obtained at any sacrifice in efficiency.

The area of the hole or holes 34 is such that for a given predetermined maximum velocity of the shock absorber, the piston 22 can move up to but at no greater velocity than is required to properly position the same to control flow of the liquid *a* from the chamber A to the chamber B for each different stroke position of the shock absorber during a normal landing of the aircraft. It follows, therefore, that any greater velocity of the shock absorber, such as that which may occur due to the wheel 13 of the aircraft encountering a "bump" in the landing runway during taxiing of the aircraft, will result in a lag in downward movement of the piston 22 with reference to collapsing stroke movement of the shock absorber. The effective area of the port 35 thus will be greater than would be the case at the same point in the collapsing stroke movement of the shock absorber had the "bump" not been encountered. The greater effective area of the port 35 thus afforded at any particular time during collapsing stroke movement of the shock absorber provides for blow-off of liquid from the chamber A to the chamber B and serves effectively to prevent choking of the port 35 by the liquid, thus insuring against any so-called "peaking" or locking of the shock absorber.

As soon as the extra velocity of the shock absorber caused by the "bump" is absorbed, the piston 22 then takes its normal position according to the pressure of the air in the chamber B at whatever the stroke position of the shock absorber may be dependent upon the load imposed thereon following encountering of the "bump."

If desired, the small cylinder 26 may be vented to the atmosphere in accordance with the teaching of my prior application, Serial No. 480,819, filed March 27, 1943, or in any other suitable manner, to insure atmospheric air pressure against the lower end of the plunger 29. If, however, an effective liquid-tight seal is provided between the cylinder 26 and the plunger 29 to prevent accumulation of liquid in said cylinder, venting of said cylinder to the atmosphere obviously is unnecessary. If the cylinder 26 is not vented to the atmosphere, downward movement of the piston into the same will cause a slight compression of the air therein, but this may be taken into account in calculating the area of the holes 34 and the strength of the spring 28 in designing the shock absorber to operate in a certain predetermined manner in any particular installation thereof.

Referring now to the embodiment of the invention illustrated in Figure 7 of the drawings, it will be observed that the shock absorber is employed as part of an airplane landing gear of the lever suspension type, being interposed between an arm 40 fixed to and depending from the fuselage 12' of an airplane and the lower, wheel carrying end portion of a second arm 41 which is pivoted at its upper end to the lower end of the arm 40.

As in the case of the shock absorber shown in Figures 1 to 6, the Figure 7 shock absorber comprises a cylinder, designated as 10'; disposed uppermost, and a piston, designated as 11', disposed lowermost. Also the Figure 7 shock absorber includes a liquid flow control valve, designated generally as 18'; which is a duplicate of the liquid flow control valve shown in Figures 1 to 6. However, in the case of the Figure 7 shock absorber, the valve 18' is inverted and is mounted in the head of the piston 11' instead of in a bulkhead in the cylinder 10' as in the case of the valve shown in Figures 1 to 6. In addition, a floating piston 42 is provided in the piston 11' to define a liquid-containing chamber A' thereabove and an air-containing chamber B' therebelow. The valve 18' operates in the same manner as the valve shown in Figures 1 to 6 to meter flow of liquid from above the head of the piston 11' to the space between the head of said piston and the floating piston 42, the latter moving downwardly as liquid is forced between the same and the head of the piston 11' and thereby serving to raise the pressure of the air in the chamber B'. In short, the Figure 7 embodiment of the invention is the same in mode of operation as the Figures 1 to 6 embodiment of the invention and differs therefrom merely in mounting the valve 18' in the head of the piston 11' instead of in a bulkhead in said cylinder, and in providing the floating piston 42 in the piston 11' to define the chambers A' and B'. The Figure 7 embodiment of the invention provides a shock absorber of comparatively short, over-all length better suited than the shock absorber shown in Figures 1 to 6 for installations such as illustrated in Figure 7 where the use of a shock absorber of any considerable length is impractical.

Referring now to the embodiment of the invention illustrated in Figures 8 and 9 of the drawings, it will be observed that the shock absorber is employed as part of an airplane landing gear of the lever suspension type in which an endless track 43 is employed in lieu of a wheel with a pneumatic tire for contact with the ground.

The shock absorber of Figures 8 and 9 is of essentially the same construction and is mounted for operation in the same manner as the shock absorber shown in Figure 7. Due, however, the endless track, designated generally as 43, lacking any equivalent of a pneumatic tire, the port 35' of the piston 22' employed in the Figure 8 embodiment of the invention does not need to be of the irregular shape shown in Figures 2, 3 and 6 to compensate for the action of a pneumatic tire. On the contrary, it need be and simply is of uniformly decreasing width from its upper to its lower end.

Figure 10 illustrates a liquid flow control valve which essentially is the same as the valve illustrated in Figures 1 to 8, except that it is constructed to have a comparatively short over-all length for use in instances where a valve of comparatively long over-all length is impractical. The main difference between the Figure 10 valve and the valve shown in Figures 1 to 8 is that the end wall 23ª of the piston 22ª of said Figure 10 valve is extended into the piston in the form of a well 44 to accommodate the spring 28ª and to afford a liquid-containing space amplifying the space between the end walls 23ª and 21ª of the piston and the valve casing 18ª, respectively. The valve casing 18ª thus may be shorter than the valve casing 18 of the valve shown in Figures 1 to 8. The valve shown in Figure 10 may, of course, be used in lieu of the valve shown in Figures 1 to 8 and vice-versa wherever optional use is permitted.

It has become more or less common practice to overload transport and other types of airplanes, and when this is done, it is the usual practice to increase the initial pressures in the shock absorber above normal. If, however, the shock absorbers are of the metering pin type, the higher-than-normal initial pressures therein throw them out of balance with the increased loads to be dissipated. In the present shock absorber this difficulty may readily be overcome by sizing the ports 34, 35, 36 and the strength of the spring 28 to properly compensate for the estimated maximum overload and the higher-than-normal pressures. The hydraulic dissipation of impact forces then would be correct for the increased load range as well as for the normal load range.

I claim:

1. A shock absorber comprising a pair of members movable relative to each other in response to imposition upon the shock absorber of impact loads, said shock absorber including a compressed air-containing chamber, a liquid-containing chamber, and a liquid metering valve comprising a casing and a hollow piston reciprocable therein for controlling flow of liquid from said liquid-containing chamber, said casing and piston having registered ports in their side walls for flow of liquid from said liquid-containing chamber, said ports being shaped to afford a different effective combined port area for each different position of said piston longitudinally relative to said casing, said members being effective when moved relative to each other by imposition of an impact load upon the shock absorber to force liquid from said liquid-containing chamber through said ports and thereby to raise the pressure of the air in said air-containing chamber, said piston being exposed at one end to the pressure of the air in said compressed air-containing chamber whereby it is urged in one direction by the pressure of the air in said compressed air-containing chamber, and yieldable means constantly urging said piston in the opposite direction and of a strength in relation to the air pressure to insure a different definite position of said piston and a different effective area of said ports for each different pressure of the air in said air-containing chamber.

2. A shock absorber comprising a pair of members movable relative to each other in response to imposition upon the shock absorber of impact loads, said shock absorber including a compressed air-containing chamber, liquid-containing chamber, and a liquid metering valve comprising a casing and a hollow piston reciprocable therein for controlling flow of liquid from said liquid-containing chamber, said casing and piston having registered ports in their side walls for flow of liquid from said liquid-containing chamber, said ports being shaped to afford a different effective combined port area for each different position of said piston longitudinally relative to said casing, said members being effective when moved relative to each other by imposition of an impact load upon the shock absorber to force liquid from said liquid-containing chamber through said ports and thereby to raise the pressure of the air in said air-containing chamber, said piston having a predetermined area thereof at one end exposed to the air pressure in said compressed-air-containing chamber and a smaller area thereof at its other end exposed to the pressure of the liquid in said liquid-containing chamber whereby it is urged in one direction by the pressure of the air in said air-containing chamber, and yieldable means tending constantly to urge said piston in the opposite direction and of a strength in relation to the air pressure to insure a different definite position of said piston and a different effective area of said ports for each different pressure of the air in said compressed-air-containing chamber.

3. A shock absorber comprising a pair of members movable relative to each other in response to imposition upon the shock absorber of impact loads, said shock absorber including a compressed air-containing chamber, a liquid-containing chamber, and a liquid metering valve comprising a casing and a hollow piston reciprocable therein for controlling flow of liquid from said liquid-containing chamber, said casing and piston having registered ports in their side walls for flow of liquid from said liquid-containing chamber, said ports being shaped to afford a different effective combined port area for each different position of said piston longitudinally relative to said casing, said members being effective when moved relative to each other by imposition of an impact load upon the shock absorber to force liquid from said liquid-containing chamber through said ports and thereby to raise the pressure of the air in said air-containing chamber, said casing and piston at their ends adjacent to said liquid-containing chamber being closed and the closed end of one of them having a hole therein for admission of liquid to the space within said casing between its closed end and the closed end of said piston and for flow of liquid from said space thus to predetermine the velocity at which said piston will move into said cylinder under any given pressure exerted inwardly thereupon, said casing and piston being open at their other ends and said piston at its said other end being exposed to the pressure of the air in said compressed-air-containing chamber, means limiting that portion of said piston which is exposed to the pressure of the liquid in said casing to an area lesser than that portion thereof which is exposed to pressure of the air in said compressed-air-containing chamber so that said piston is moved inwardly by the air pressure, and yieldable means tending constantly to urge said piston outwardly relative to said casing and of a strength in relation to the air pressure to insure a different definite position of said piston and a different effective area of said ports for each different pressure of the air in said compressed-air-containing chamber.

4. A shock absorber comprising a cylinder closed at its upper end and open at its lower end, a piston slidably mounted in the lower end portion of said cylinder and movable into and from said cylinder in response to impact and recoil loads, respectively, imposed upon the shock absorber, a bulkhead in said cylinder dividing the same into a lower liquid-containing chamber and an upper compressed-air-containing chamber, and a liquid metering valve carried by said bulkhead for controlling flow of liquid from said liquid-containing chamber and vice-versa, said valve comprising a casing extending through said bulkhead and closed at its lower end and open at its upper end and having lower and upper ports in its side wall below and above said bulkhead, respectively, a hollow piston valve slidable in said casing and closed at its lower end and open at its upper end and having lower and upper ports in its side wall registered with said lower and upper casing ports, respectively, each related pair of said ports being shaped to afford a different effective combined port area for each different position of said piston valve longitudinally relative to said casing, an upwardly opening check valve cooperating with the upper open end of said piston valve, the closed lower end of said piston valve having a hole therein for flow of liquid into and from the lower end of said casing, a small low-air-pressure containing cylinder and a cooperating piston in the lower end portion of said casing one fixed with respect to said piston valve and the other fixed with respect to said casing so that the bottom area thereof exposed to the pressure of the liquid is lesser than the top area thereof exposed to the pressure of the compressed air, and a spring tending constantly to urge said piston valve upwardly and of a strength in relation to the pressure of the air in said compressed-air-containing chamber to insure a different definite position of said piston valve longitudinally relative to said casing and a different effective area of each related pair of said ports for each different pressure of the air in said air-containing chamber.

5. A shock absorber comprising a cylinder closed at its upper end and open at its lower end, a hollow piston slidably mounted in the lower end portion of said cylinder and movable into and from said cylinder in response to impact and recoil loads, respectively, imposed upon the shock absorber, a wall closing the upper end of said piston, a floating piston in said hollow piston, said hollow piston below said floating piston containing compressed air and said cylinder and hollow piston above said floating piston containing liquid, and a liquid metering valve carried by the wall closing the upper end of said hollow piston, said valve comprising a casing extending through said wall and closed at its upper end and open at its lower end and having upper and lower ports in its side wall above and below the said wall of said hollow piston, respectively, a hollow piston valve longitudinally slidable on said casing and closed at its upper end and open at its lower end and having upper and lower ports in its side wall registered with said upper and lower casing ports, respectively, each related pair of said ports being shaped to afford a different effective combined area for each different position of said piston valve longitudinally relative to said casing, a downwardly opening check valve cooperating with the lower open end of said piston valve, the closed upper end of said piston valve having a hole therein for flow of liquid into and from the upper end of said casing, a small low-air-pressure containing cylinder and a cooperating piston in the upper end portion of said casing, one fixed with respect to said piston valve and the other fixed with respect to said casing so that the top area of said piston valve exposed to the pressure of the liquid is lesser than the bottom area thereof exposed to the pressure of the compressed air in said hollow piston, and a spring tending constantly to urge said piston valve downwardly and of a strength in relation to the pressure of the air in said hollow piston to insure a different definite position of said piston valve longitudinally of said casing and a different effective area of each related pair of said ports for each different pressure of the air in said hollow piston.

6. A shock absorber, as set forth in claim 3, in which an outwardly opening check valve cooperates with the open end of the hollow piston, and in which the casing and the piston have registered ports in their side walls controlling return flow of liquid to the liquid-containing chamber.

NEVIN S. FOCHT.